S. DICKSON.
PACKING FOR ACETYLENE GAS TANKS.
APPLICATION FILED APR. 4, 1910.
962,199.
Patented June 21, 1910.
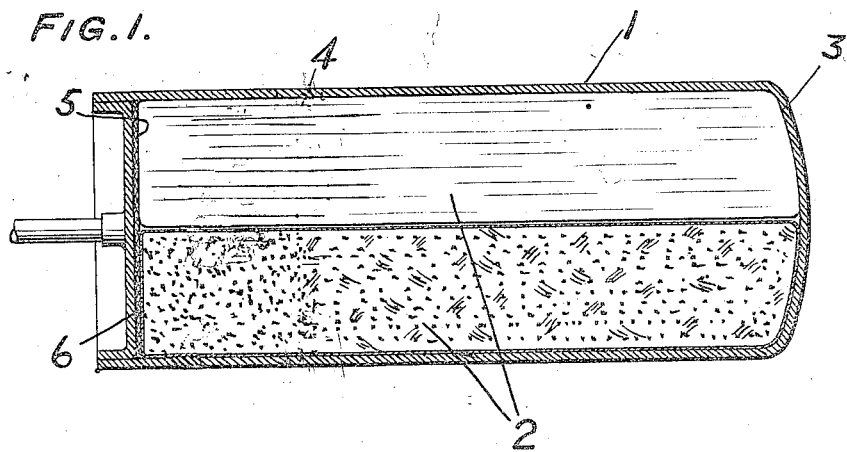
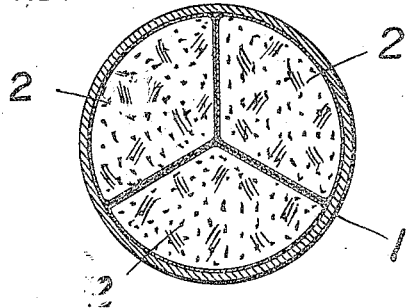
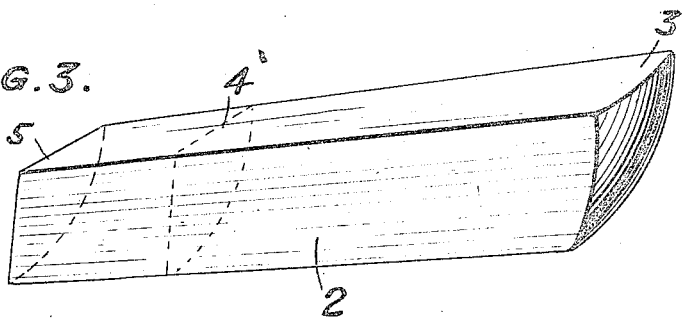
WITNESSES:
INVENTOR
Stewart Dickson
BY
Augustus B. Stoughton
ATTORNEY.

UNITED STATES PATENT OFFICE.

STEWART DICKSON, OF UPPER MONTCLAIR, NEW JERSEY.

PACKING FOR ACETYLENE-GAS TANKS.

962,199.    Specification of Letters Patent.    Patented June 21, 1910.

Application filed April 4, 1910.    Serial No. 553,346.

*To all whom it may concern:*

Be it known that I, STEWART DICKSON, a subject of the King of Great Britain, but having declared my intention of becoming a citizen of the United States, and residing in Upper Montclair, in the county of Essex and State of New Jersey, have invented certain new and useful Improvements in Packing for Acetylene-Gas Tanks, of which the following is a specification.

The principal object of the present invention is to provide a packing or filling for an acetylene tank which shall completely fill the tank and at the same time possess increased porosity or number of voids and which shall be sufficiently supported for preventing settling or consolidation and consequent creation of undesirable spaces of considerable size, and which possessed of these qualities and properties shall withstand the heat incident to welding on the head of the tank after the packing has been put into it.

Another object of the invention is to prevent particles of the packing from accidentally passing off with the gas.

The invention will be claimed at the end hereof, but will first be described in connection with the particular embodiment of it selected from among various embodiments of it, for illustration in the accompanying drawings, in which—

Figure 1, is a transverse sectional view illustrating a packing or filling embodying features of the invention and arranged in an acetylene tank. Fig. 2, is a transverse sectional view of Fig. 1, and Fig. 3, is a perspective view illustrating one section of the packing and containing dotted lines hereinafter referred to.

In the drawings 1, is an acetylene tank, the shape and size of which may be varied. It is completely filled with the packing or filling which is shown as cylindrical with one flat end and one partly spherical or convex end. The packing is made up of sections 2, which are duplicates of each other and of which three are shown, although the number may be increased or diminished. These sections 2, when fitted together, constitute in effect a solid body. Each section 2 throughout a portion of its length, for example between its end 3 and the dotted line 4, consists of a mixture of cotton and asbestos fiber, which is in consistency something like cotton batting and is therefore extremely porous. From the end 5 to the dotted line 4, or in other words, throughout a part of its length, each section consists of asbestos fiber preferably pure long fiber asbestos, and this is also porous. A suitable mixture for one end of the section consists of 12%, by weight, of cotton and 88%, by weight, of asbestos. The mixture of cotton and asbestos extends only far enough to be unaffected by the heat incident to welding on the end of the tank and the parts of the packing exposed to the heat consist of the pure asbestos fiber. Merely by way of illustration it may be said that in a tank 18″ long, the pure fiber extends for 4″, but of course this is subject to variation with the size of the tank and the amount of heat used. The surface of each section constitutes a hard, strong wall that serves to support and give strength to it.

By making the filling or packing in a number of sections the number of these hard supporting walls is increased and there is therefore no extended cross-section of fibrous material. In this way the fibrous material is prevented from settling, which is desirable, because if it settled it would leave spaces that would be objectionable. The settling or undesirable packing of the fiber may be brought about in many ways, but the jar of an automobile, on which these tanks are largely used, is found to be sufficient in cases where the tank is simply filled with a non-sectional packing; whereas in the case of a sectional packing the multiplicity of walls serve to prevent packing of the fibrous material. At one end of the packing, where the gas is drawn off, a layer of asbestos cloth 6 may be advantageously applied and it serves as a strainer to prevent any loose particles of the packing going out of the tank with the gas.

The walls or exterior surface of each of the sections may be made hard and strong by treating them with a solution, as of silicate of soda, which forms a hard, tough, strong skin. Inasmuch as the sections are comparatively small and the strong surface skin of each serves to support its fibrous contents, it follows that the latter need not be packed hard because there is comparatively little of it in each section and in this way the porosity of the packing, as a whole, can be increased.

What I claim is:

1. A packing or filling for acetylene gas tanks comprising sections adapted to be fitted together to fill the tank and each having a hard, strong skin and consisting throughout a portion of its length of a mixture of asbestos and cotton fiber and throughout the rest of its length of asbestos fiber, substantially as described.

2. A packing or filling for acetylene gas tanks consisting throughout a portion of its length of a mixture of cotton and asbestos fiber and throughout the rest of its length with asbestos fiber which resist heat incident to welding the tank, substantially as described.

In testimony whereof I have hereunto signed my name.

STEWART DICKSON.

Witnesses:
ANNIE S. CHALMERS,
A. J. FITZGIBBON.